Sept. 10, 1957 A. MULLER 2,806,128
WELDING ELECTRODE
Filed Nov. 15, 1954
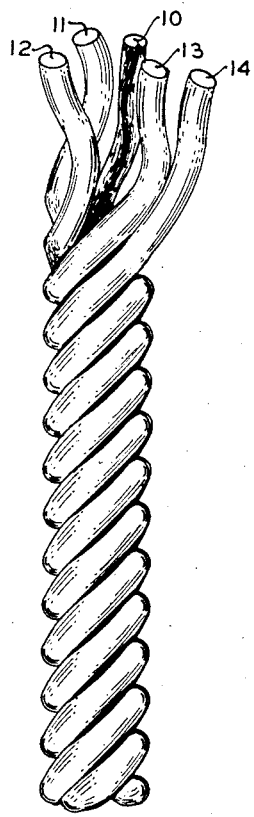
INVENTOR
ALBERT MULLER
BY
ATTORNEY

United States Patent Office 2,806,128
Patented Sept. 10, 1957

2,806,128
WELDING ELECTRODE

Albert Muller, Watchung, N. J., assignor to Air Reduction Company, Incorporated, New York, N. Y., a corporation of New York Application November 15, 1954, Serial No. 468,643

3 Claims. (Cl. 219—146)

This invention relates to welding electrodes, and more particularly to electrodes for inert gas shielded consuming electrode metal arc welding.

This application is a continuation-in-part of my prior co-pending application Serial No. 288,447 and of my prior co-pending application Serial No. 288,448, both filed May 17, 1952 and assigned to the assignee of the present invention, now Patent Nos. 2,694,763 and 2,694,764, respectively.

In these prior applications there is disclosed new inert gas shielded consuming electrode metal arc welding methods that involve the addition of certain materials to the arc to affect the arc stability, heat balance, and metal transfer characteristics.

An object of this invention is to provide a novel electrode for use in the inert gas shielded metal arc welding processes disclosed in my prior co-pending applications Serial Nos. 288,447 and 288,448.

According to the present invention, a plurality of wire strands are formed into a unitary electrode in which one or more of the individual strands contain an emissive agent (as defined in my prior applications) either as a constituent of the strand wire or as an addition applied to the surface of the strand. The several strands which collectively form the electrode may all be of the same composition or one or more of the strands may differ in composition from the remainder. Examples of stranded electrodes in which the individual strands differ in composition may be found in Robinson Patent No. 2,612,581, issued September 30, 1952, and Robinson application Serial No. 228,009, filed May 24, 1951, both assigned to the assignee of the present invention. One of the advantages of making an electrode wire of several strands such as disclosed in the Robinson patent and application is that an electrode which will produce a hard nonductile weld deposit can be made of inexpensive ductile components and the electrode so produced can be of long lengths and readily wound on, and unwound from a reel.

In the single figure of the drawing a stranded electrode is illustrated having a center core strand and a plurality of surrounding strands twisted thereabout. Referring to the figure, the center strand 10 is surrounded by four outer strands 11, 12, 13, and 14, helically wound around the core strand. According to the present invention a substance comprising a metal selected from the group consisting of the alkali metals, the alkaline earth metals, lanthanum and the lanthanum series rare earth metals, actinium and the actinium series rare earth metals, scandium, and yttrium, is added to one or more of the strands, and preferably to the center strand 10, as an ingredient in the strand wire, or as an addition to the surface of the strand wire. Such materials when added to the inert gas shielded arc act to form with a cold cathode base metal a composite emission surface having thermionic emission properties which contribute to the several beneficial results described in my prior co-pending applications.

The metals listed above which are effective as emissive additions can be added to the arc either in elemental or metallic form, or in the form of compounds thereof, which will either partially or wholly dissociate in the arc and liberate the said elements. For example, the oxides, carbonates, borates, phosphates, nitrates, silicates, or halides, of said elements can be used. Mixtures of two or more of said elements and/or compounds may be used and are often particularly effective. The alkali metals are lithium, sodium, potassium, rubidium, cesium and francium. The alkaline earth metals are calcium, barium, strontium and radium. Lanthanum series rare earths are cerium, praseodymium, neodymium, promethium, samarium, europium, gadolinium, terbium, dysprosium, holmium, erbium, thulium, ytterbium, lutecium. Actinium series rare earth metals are thorium, protactinium, uranium, neptunium, plutonium, americium, and curium.

Many of the elements and compounds thereof in the periodic groups listed immediately above are rare and expensive, and some are dangerously radioactive. Therefore, it is preferred both for practical reasons and also because particularly beneficial and highly desirable results may be obtained therefrom in the inert shielded metal arc welding of the common structural metals to use an emissive agent which is an element selected from the group consisting of potassium, rubidium, cesium, strontium, barium, lanthanum, and cerium.

Specific examples of presently preferred addition materials are cesium nitrate, rubidium carbonate, cesium-rubidium chloride, barium oxide or carbonate, barium-strontium mixtures in the form of oxides or carbonates, lanthanum and lanthanum series rare earth mixtures in metallic and oxide forms, and potassium carbonate.

In the preferred form of the invention the emissive additions are made to the electrode in the form of a superficial addition to the surface of one or more of the individual strands of the composite electrode. Such an addition may be applied in the manner described in detail in my prior co-pending applications Serial Nos. 288,447 and 288,448. The emissive addition may, of course, also be made by alloying or otherwise adding one or more of the metals listed above to the strand wire of one or more of the individual strands.

It is to be understood that the several strands of the composite electrode may be of the same composition, exclusive of the emissive addition, or they may vary in composition to form an alloy weld deposit which is a composite aggregate of the several strands. In the preferred form of the invention the emissive addition is made to the central core strand or wire which is surrounded by a plurality of bare wire strands free of emissive additions. During the welding process the emissive addition provided by the core strand acts to form a composite surface with the molten metal of all of the strands of the composite electrode to effect a weld according to my prior applications.

It is to be understood that this invention is not limited to composite electrodes in which there is a single core strand surrounded by a plurality of outer strands, but applies equally well to twisted electrodes in which there is no core wire and composite electrodes having a plurality of core wires. It is also to be understood that while it is preferred to make the emissive addition to the core wire, it may be made to any one or more of the strands. It is to be understood further, that the invention is not limited to the particular forms described, but may be used in other ways without departing from its spirit as defined by the following claims.

I claim:

1. An arc welding electrode comprising a plurality of wire strands combined to form a unitary electrode structure having an electrically conductive outer surface adapted to make electrical contact with a current feeding device as the electrode moves in sliding contact therewith, said electrode including as an essential ingredient thereof a substance comprising a metal selected from the group consisting of the alkali metals, the alkaline earth metals, lanthanum and the lanthanum series rare earth metals, actinium and the actinium series rare earth metals, scandium, and yttrium, which substance acts in the region of the arc with the metal of all of the wire strands to form a composite emission surface thereon, said substance being provided as a component of at least one of said strands, and at least one of said strands being free of said substance.

2. An arc welding electrode according to claim 1 in which the several strands are in the form of a core strand and a plurality of strands surrounding said core strand and in which said substance is provided as a component of said core strand.

3. An arc welding electrode according to claim 1 in which at least two of said strands are of dissimilar composition.

References Cited in the file of this patent

UNITED STATES PATENTS

| | | |
|---|---|---|
| 1,294,250 | Elliott | Feb. 11, 1919 |
| 1,361,269 | Mattice | Dec. 7, 1920 |
| 1,363,636 | Brace | Dec. 28, 1920 |
| 1,884,712 | Jerabek | Oct. 25, 1932 |
| 2,694,763 | Muller | Nov. 16, 1954 |

FOREIGN PATENTS

| | | |
|---|---|---|
| 302,064 | Great Britain | Dec. 13, 1928 |